United States Patent Office 2,856,428
Patented Oct. 14, 1958

2,856,428

METHOD FOR HYDROGENATING ORGANIC COMPOUNDS BY REACTING WITH ALKALI METAL BOROHYDRIDES

Herbert C. Brown, West Lafayette, Ind.

No Drawing. Application July 13, 1955
Serial No. 521,873

22 Claims. (Cl. 260—570.9)

This invention relates to the use of alkali metal borohydrides for reducing and hydrogenating chemical compounds containing a reducible functional group. The invention provides means for increasing the rate and capacity of alkali metal borohydrides for reducing such compounds.

The United States patent to H. I. Schlesinger and Herbert C. Brown No. 2,683,721 describes methods for reducing and hydrogenating chemical compounds by associating the compound with an alkali metal borohydride in a liquid carrier. The time required for effecting the reductions as well as the yields obtained by these methods varies greatly with the compound to be reduced and with the different alkali metal borohydrides. For example, as illustrated by the above mentioned patent ethyl benzoate may be reduced to benzyl alcohol by refluxing a reaction mixture of ethyl benzoate and lithium borohydride in tetrahydrofuran for eight hours, the yield being 60% of theoretical. When sodium borohydride is used the reaction requires a longer time and the yield is lower. In contrast, ethyl benzoate may be substantially completely reduced using sodium borohydride in accordance with the present invention in a few minutes.

The use of calcium borohydride for reducing chemical compounds also has been proposed (Nature, vol. 173, page 125, and Nature, vol. 175, page 346). The use of this reagent also requires a long reaction time with careful control of temperature and the yields are poor.

The present invention is based upon the discovery that the addition of relatively minor amounts of aluminum chloride to solutions of sodium borohydride in the dimethylether of diethylene glycol or the dimethylether of triethylene glycol greatly increases the reducing rates and capacities of the borohydride. With such solutions both esters and carboxylic acids are completely reduced at room temperatures in approximately thirty minutes. Nitriles and other functional groups which are not readily reduced by sodium borohydride are readily reduced by such solutions. It is possible also to react such solutions at higher temperatures with 1-olefins, such as 1-hexene and styrene, and to reduce selectively the 1-olefin group of diisobutylene. Other solvents may be utilized, such as tetrahydrofuran, diethyl ether and dioxane, in place of the polyethylene glycol dimethylethers although the latter are the most satisfactory. Also, other Friedel-Crafts catalysts may be used, such as gallium trichloride and titanium tetrachloride, although the aluminum halides, such as aluminum chloride and aluminum bromide, appear to be the most useful of the catalysts for reasons of both economy and effectiveness.

Broadly stated, the present invention provides a reagent and reaction medium for effecting reduction and hydrogenation of a chemical compound having a reducible functional group, the reagent comprising essentially an alkali metal borohydride and a halide of a polyvalent metal having a valence greater than two and less than six in a liquid carrier providing the metal is not rapidly reduced to a lower valence by the reagent. For the most rapid and complete reduction of the chemical compound, the reagent should contain equivalent amounts of the borohydride and metal halide. Thus, when sodium borohydride and aluminum chloride are used it is preferred that they be present in the reagent in the proportion of three moles of the borohydride to one mole of the halide. The method of using the reagent comprises associating the chemical compound with it and at a temperature sufficient to cause reduction of the chemical compound but sufficiently low that the borohydride does not substantially thermally decompose.

The terms "hydrogenation" and "reduction" are used interchangeably herein. The term "alkali metal borohydride" as used herein is intended to mean the simple alkali metal borohydrides, such as sodium borohydride, potassium borohydride and lithium borohydride. The term "polyvalent metal" is used herein to mean true metals and does not include either metalloids, such as boron or silicon, or non-metals, such as phosphorus.

During preliminary investigations anhydrous aluminum chloride was sublimed and dissolved in dimethylether of diethylene glycol to form a two molar solution. Sodium borohydride recrystallized from dimethyl ether of diethylene glycol was dissolved in the same solvent to form a two molar solution. When equivalent amounts of sodium borohydride and aluminum chloride in this solvent are mixed, a clear colorless solution is obtained. The absence of a precipitate indicates that the simple formation of aluminum borohydride is not produced as indicated by the equation

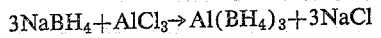

$$3NaBH_4 + AlCl_3 \rightarrow Al(BH_4)_3 + 3NaCl$$

The reagent is quite stable to air. Dry air was passed over the reagent for two hours and there was a loss of but 12% of the available hydride. When air was not passed over the solution continuously, the loss in hydride with time was negligible. The solution can be poured from one vessel to another in open air without apparent change. When poured into water slowly, gas is evolved along with white fumes and a gelatinous precipitate is formed.

Other preliminary investigations in the reduction of esters using an excess of sodium borohydride with aluminum chloride in various degrees of deficiency indicated that nearly three moles of borohydride are utilized per mole of aluminum chloride used. This favors the formation of aluminum borohydride as an intermediate in this reaction. As previously pointed out, no precipitate is obtained when solutions of sodium borohydride and aluminum chloride are mixed which indicates that aluminum borohydride is not produced. While I do not wish to be limited to any theory with respect to the mechanics of the reactions which take place in the practice of the invention, these conflicting observations may be reconciled by assuming that there are formed only minute amounts of aluminum borohydride in the initial stages of the reaction and more is formed only as the aluminum borohydride is utilized in the reaction.

Further investigations were carried out by mixing 5 millimoles of ethyl benzoate and 5 millimoles of sodium borohydride in the form of the previously mentioned two molar solution in a 50 cc. round-bottom flask at 25° C. and then adding drop by drop 1.67 millimoles of aluminum chloride in the form of the previously mentioned two molar solution as the flask was swirled by hand to cause mixing of the reagents. A vigorous reaction occurred resulting in a rise in temperature to 50–60° C. followed by a drop back to room temperature. The reduction of the ester was essentially complete within a few minutes.

In order to control the temperature to within narrow limits, the reduction was repeated with the flask maintained at 25° C. with the aid of a water bath, and the aluminum chloride solution was added sufficiently slowly to permit the 25° C. temperature to be maintained. A duplicate blank experiment was run without the ester present. At the end of the reaction time, both the blank reaction mixture and that with the ester were hydrolyzed. The difference in the residual active hydrogen in the two experiments was taken as the amount of hydride used for reduction of ester. At 25° C., using 100% excess hydride, reduction was complete in one hour. Similar experiments were made for reducing ethyl stearate, ethyl p-nitrobenzoate and ethyl cinnamate. In the reduction of the ethyl cinnamate three molar equivalents of hydride were utilized, indicating the reduction of the double bond as well as the ester group.

In order to ascertain optimum conditions for the ester reduction, the reduction of ethyl benzoate was studied at 25° C., 50° C. and 75° C. using at each temperature (a) the theoretically required quantity of sodium borohydride (one mole of borohydride to two moles of ester), (b) 20 percent excess of borohydride and (c) 50 percent excess of borohydride. The results indicate that essentially quantitative reduction is achieved under the following conditions:

| Temperature, ° C. | Time of reaction, hours | Excess borohydride, percent |
|---|---|---|
| 25 | 3 | 50 |
| 50 | 3 | 20 |
| 50 | 0.5 | 50 |
| 75 | 0.5 | 20 |
| 75 | 0.1 | 50 |

Using the optimum conditions tested for ethyl benzoate, a number of esters were reduced including ethyl acetate, ethyl stearate, ethyl p-chlorobenzoate, ethyl oleate, ethyl cinnamate and ethyl p-nitrobenzoate. The results indicate that reduction of an ester group can be accomplished in the presence of a nitro group and that aromatic halogen offers no complication. On the other hand, in the reduction of ethyl cinnamate, the double bond conjugated with the ester group results in reduction of both groups.

While in the practice of the present invention it is presently preferred to employ the dimethylether or diethylene glycol or the dimethylether of triethylene glycol as the liquid carrier, other liquid carriers may be used. Usually, however, when the liquid carrier is not a solvent for the alkali metal borohydride, more satisfactory results are obtained if an amount of a polyethylene glycol dimethylether sufficient to solubilize the alkali metal borohydride is used in conjunction with the non-solvent liquid carrier. Thus, substantially quantitative reductions are achieved with a reagent comprising sodium borohydride, aluminum chloride and a liquid carrier containing 20 percent of the dimethylether of dimethylene glycol and 80 percent of tetrahydrofuran while only about an 85% reduction is achieved when the liquid carrier is entirely tetrahydrofuran.

In the practice of the invention the metal halide may be added to a mixture of the chemical compound and alkali metal borohydride in the liquid carrier or a mixture of the metal halide and borohydride in the liquid carrier may be formed and then added to the chemical compound or vice versa. Alternatively, the chemical compound and metal halide may be mixed and the borohydride in the liquid carrier added thereto.

The present invention greatly expands the utility of the alkali metal borohydrides in industry. The reagent of the invention not only is useful for reducing and hydrogenating chemical compounds which were known previously to be reducible by the alkali metal borohydrides but the reagent increases the rate and capacity of the alkali metal borohydrides for reducing such compounds. While the alkali metal borohydrides had previously been useful principally for reducing chemical compounds containing a reducible functional group including an atom other than hydrogen and carbon, the reagent of the invention makes the alkali metal borohydrides available for reducing compounds having other reducible groups.

The following is illustrative of the utilization of sodium borohydride from the reagent by various compounds usually at 25° C. The first figure gives the time of reaction in hours and the second gives the moles of hydride per mole of compound (one mole of hydride utilized to form hydrogen in the case of carboxylic acids and amides is not included in figure): ethyl acetate (0.5, 2.0); ethyl stearate (0.5, 2.0); ethyl p-chlorobenzoate (0.5, 2.0); ethyl oleate (0.5, 2.2); ethyl cinnamate (0.5, 3.0); ethyl p-nitrobenzoate (0.5, 2.0); benzoic acid (0.5, 2.0); benzoyl chloride (3.0, 2.0); benzonitrile (3.0, 2.0); acetonitrile (3.0, 2.0); pyridine-N-oxide (3.0, 1.0); benzaldehyde (0.5, 1.0); benzophenone (0.5, 1.0); styrene (1.0, 1.0); 1-hexene (25°, 3.0, 0.8; 75°, 1.0, 1.0); benzamide (3.0, 0.0); nitrobenzene (3.0, 0.0).

The reagent is useful for the selective reduction of 1-olefins. At 75° C. the reagent reacted with diisobutylene (75% 2,4,4-trimethyl-1-pentene, 25% 2,4,4-trimethyl-2-pentene) to absorb only 75% of the theoretically required amount of hydride, indicating reaction only with the 1-olefin. It should be noted that the reagent also is particularly useful for reduction of esters to alcohols, carboxylic acids to alcohols, nitriles to amines, and acid halides to alcohols as well as for the reduction of 1-olefins to hydrocarbons. It should be noted that neither benzamide nor nitrobenzene are reduced by the reagent under the conditions whereby esters are reduced.

The invention is further illustrated by the following examples:

The hydrogenation of ethyl stearate with sodium borohydride 0.25 mole of sodium borohydride (99% purity) and 250 ml. of dimethylether of diethylene glycol were placed in a clean dry 3-necked flask of 1-liter capacity, fitted with a mechanical stirrer, dropping funnel and a calcium chloride guard tube. The contents of the flask were stirred for 15–20 minutes to cause solution of the sodium borohydride. Then 0.4 mole (125.0 g.) of ethyl stearate was added and the reaction mixture stirred to cause thorough mixing. Then 0.084 mole of aluminum chloride (42.0 ml. of a freshly prepared two molar solution in dimethylether of diethylene glycol) was added slowly from the dropping funnel with vigorous stirring. An exothermic reaction set in with the evolution of a small amount of gas.

After the initial vigorous reaction had ceased and the temperature of the contents of the flask had started to drop, the flask was heated on a steam cone for about one hour to complete the reaction. The contents were then poured into a 2-liter beaker containing 600 grams of crushed ice and 100 ml. of concentrated hydrochloric acid. A white precipitate of stearyl alcohol was formed. The precipitate was collected on a filter, washed free of acid, pressed and dried. The crude product weighed 102.8 grams (95% yield). Recrystallization from aqueous alcohol gave shiny flakes, M. P. 58–59° C. in a yield of 91 percent.

The hydrogenation of ethyl p-chlorobenzoate with sodium borohydride

The reduction of ethyl p-chlorobenzoate was carried out in exactly the same manner as described in the preceding example, using 0.4 mole of ester with 0.25 mole of sodium borohydride and 0.084 mole of aluminum chloride. The weight of crude product was 50.9 grams (89.3% yield). After recrystallization from hot water the product weighed 48.0 grams and had a melting point of 75° C., the yield being 84 percent.

The hydrogenation of ethyl p-nitrobenzoate with sodium borohydride

Ethyl p-nitrobenzoate was treated exactly as described in the preceding examples. A yield of 87% of p-nitrobenzyl alcohol was obtained.

The hydrogenation of ethyl stearate with potassium borohydride 0.10 mole of potassium borohydride and 100 ml. of dimethyl ether of triethylene glycol were placed in a flask of 500 ml. capacity, fitted with a mechanical stirrer and dropping funnel. Then 0.16 mole (50.0 g.) of ethyl stearate was added and the reaction mixture stirred for several minutes to cause thorough mixing. The 0.33 mole of aluminum chloride (16.7 ml. of a freshly prepared two molar solution of aluminum chloride in the dimethyl ether of triethylene glycol) was added from the dropping funnel with vigorous stirring. After the initial vigorous reaction had ceased, the reaction vessel was heated on a steam cone for several minutes to complete the reaction. The contents were hydrolyzed with dilute hydrochloric acid and crushed ice as described previously. After recrystallization from aqueous alcohol, stearyl alcohol was obtained as white, shiny flakes, M. P. 58–59° in a yield of 85%.

The hydrogenation of ethyl p-chlorobenzoate with lithium borohydride

The reduction of ethyl p-chlorobenzoate by lithium borohydride and aluminum chloride in ethyl ether proceeds smoothly at the boiling point of the solvent in a few minutes. The vigor of the reaction is such that the aluminum chloride solution (in ethyl ether) should be added with care in order not to exceed the capacity of the condenser. In this way, from a reaction mixture of 1.0 moles of ester, 0.30 mole of lithium borohydride, and 0.10 mole of aluminum chloride in a total of 1 liter of ethyl ether there was obtained a 95% yield of p-chlorobenzyl alcohol, M. P. 75°.

The hydrogenation with other metal halides

Ethyl benzoate was treated at temperatures of 25° C. and 75° C. with sodium borohydride and gallium trichloride in dimethylether of diethylene glycol in the same relative amounts of ester, borohydride, halide and ether as described in the previous example for reducing ethyl stearate. At the lower temperature the reaction was slow. At 75° C. the reaction was 90 percent complete in one hour and was 100 percent complete in two hours.

When ethyl benzoate was treated similarly but using titanium tetrachloride instead of gallium trichloride, the ester was reduced only 23 percent in three hours at a temperature of 25° C. However, at 75° C. there was obtained 82 percent reduction in one hour and 99 percent reduction in two hours.

The claims of my copending application Serial No. 619,355, filed October 30, 1956, are directed to a method of preparing an organoboron compound by reacting an organic compound containing an olefinic double bond or an acetylenic triple bond with an alkali metal borohydride and a halide of a polyvalent metal having a valence greater than two and less than six.

The claims of the present application are directed to the reduction of an organic compound having a reducible functional group with an alkali metal borohydride and a halide of a polyvalent metal having a valence from three to five, the organic compound being free from olefinic and acetylenic bonds.

I claim:

1. A reagent for effecting reduction of an organic compound having a reducible functional group which consists essentially of an alkali metal borohydride and a halide of a polyvalent metal having a valence from three to five in a liquid carrier containing an ether, said organic compound being free from olefinic and acetylenic bonds.

2. The reagent of claim 1 wherein the liquid carrier includes an ether selected from the group consisting of the dimethylethers of diethylene glycol and triethylene glycol in an amount at least sufficient to solubilize said borohydride.

3. The reagent of claim 1 wherein the metal halide is an aluminum halide.

4. The reagent of claim 1 wherein the metal halide is aluminum chloride.

5. The reagent of claim 2 wherein the metal halide is an aluminum halide.

6. The reagent of claim 2 wherein the metal halide is selected from the group consisting of aluminum chloride and aluminum bromide.

7. The reagent of claim 2 wherein the metal halide is aluminum chloride.

8. A reagent for effecting reduction of an organic compound having a reducible functional group which consists essentially of sodium borohydride and a halide of a polyvalent metal having a valence from three to five in a liquid carrier containing an ether, said organic compound being free from olefinic and acetylenic bonds.

9. The reagent of claim 8 wherein the liquid carrier includes an ether selected from the group consisting of the dimethylethers of diethylene glycol and triethylene glycol in an amount at least sufficient to solubilize said borohydride.

10. The reagent of claim 8 wherein the metal halide is an aluminum halide.

11. The reagent of claim 8 wherein the metal halide is aluminum chloride.

12. The reagent of claim 9 wherein the metal halide is an aluminum halide.

13. The reagent of claim 9 wherein the metal halide is selected from the group consisting of aluminum chloride and aluminum bromide.

14. The reagent of claim 9 wherein the metal halide is aluminum chloride.

15. The reagent of claim 9 wherein the metal halide is titanium tetrachloride.

16. The reagent of claim 9 wherein the metal halide is gallium trichloride.

17. In the reduction of an organic compound having a reducible functional group, the step which comprises associating said compound and an alkali metal borohydride with a halide of a polyvalent metal having a valence from three to five in a liquid carrier containing an ether and at a temperature sufficient to cause reduction of the chemical compound but sufficiently low such that said borohydride does not substantially thermally decompose during the reduction, said organic compound being free from olefinic and acetylenic bonds.

18. The method of claim 17 wherein the liquid carrier includes a liquid selected from the group consisting of dimethylethers of diethylene glycol and triethylene glycol in an amount at least sufficient to solubilize the borohydride.

19. In the reduction of a hydrocarbon derivative compound containing an ester functional group, the step which comprises associating said compound and an alkali metal borohydride with a halide of a polyvalent metal having a valence from three to five in a liquid carrier containing an ether and at a temperature sufficient to cause reduction of said ester group but sufficiently low such that said borohydride does not substantially thermally decompose during the reduction, said hydrocarbon derivative compound being free from olefinic and acetylenic bonds.

20. In the reduction of a hydrocarbon derivative compound containing a carboxylic acid functional group, the step which comprises associating said compound and an alkali metal borohydride with a halide of a polyvalent metal having a valence from three to five in a liquid carrier containing an ether and at a temperature sufficient to cause reduction of said carboxylic acid group but sufficiently low such that said borohydride does not substantially thermally decompose during the reduction, said hydrocarbon derivative compound being free from olefinic and acetylenic bonds.

21. In the reduction of a hydrocarbon derivative compound containing a nitrile functional group, the step which comprises associating said compound and an alkali metal borohydride with a halide of a polyvalent metal having a valence from three to five in a liquid carrier containing an ether and at a temperature sufficient to cause reduction of said nitrile group but sufficiently low such that said borohydride does not substantially thermally decompose during the reduction, said hydrocarbon derivative compound being free from olefinic and acetylenic bonds.

22. In the reduction of a hydrocarbon derivative compound containing an acid halide functional group, the step which comprises associating said compound and an alkali metal borohydride with a halide of a polyvalent metal having a valence from three to five in a liquid carrier containing an ether and at a temperature sufficient to cause reduction of said acid halide group but sufficiently low such that said borohydride does not substantially thermally decompose during the reduction, said hydrocarbon derivative compound being free from olefinic and acetylenic bonds.

References Cited in the file of this patent

UNITED STATES PATENTS

| | | |
|---|---|---|
| 2,576,311 | Schlesinger et al. | Nov. 27, 1951 |
| 2,599,203 | Schlesinger et al. | June 3, 1952 |
| 2,657,975 | Hinkamp | Nov. 3, 1953 |
| 2,683,721 | Schlesinger et al. | July 13, 1954 |
| 2,765,346 | Paul et al. | Oct. 2, 1956 |

OTHER REFERENCES

Hoekstra et al.: J. A. C. S., vol. 71, pp. 2488–92 (1949).

Fuchs et al.: Nature, vol. 173, pp. 125–6 (1954).

Fuchs et al.: Nature, vol. 175, p. 346 (Feb. 19, 1955).

Gaylord: "Reduction with Complex Metal Hydrides," pp. 51, 52 and 53 (1956), by Interscience Publishers, Inc., 250 Fifth Ave., New York 1, N. Y.

Lithium Aluminum Hydride, Bulletin 401B, 8 pp., Metal Hydrides, Inc., 12–24 Congress St., Beverly, Mass.